United States Patent
Kaneko et al.

(10) Patent No.: US 10,821,964 B2
(45) Date of Patent: Nov. 3, 2020

(54) CONTROL APPARATUS AND CONTROL METHOD FOR VEHICLE

(71) Applicant: SUBARU CORPORATION, Tokyo (JP)

(72) Inventors: Atsushi Kaneko, Tokyo (JP); Masahiro Ono, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/411,260

(22) Filed: May 14, 2019

(65) Prior Publication Data
US 2019/0381996 A1 Dec. 19, 2019

(30) Foreign Application Priority Data

Jun. 14, 2018 (JP) .................. 2018-113241

(51) Int. Cl.
| | |
|---|---|
| *B60W 20/14* | (2016.01) |
| *B60K 6/448* | (2007.10) |
| *B60K 6/445* | (2007.10) |
| *B60W 10/08* | (2006.01) |
| *F01N 11/00* | (2006.01) |
| *B60W 10/06* | (2006.01) |
| *B60W 30/18* | (2012.01) |

(52) U.S. Cl.
CPC ............ *B60W 20/14* (2016.01); *B60K 6/445* (2013.01); *B60K 6/448* (2013.01); *B60W 10/06* (2013.01); *B60W 10/08* (2013.01); *F01N 11/007* (2013.01); *B60W 30/18127* (2013.01)

(58) Field of Classification Search
None
See application file for complete search history.

(56) References Cited

U.S. PATENT DOCUMENTS

| | | | |
|---|---|---|---|
| 6,186,255 B1 * | 2/2001 | Shimasaki | B60K 6/365 180/65.25 |
| 6,847,189 B2 * | 1/2005 | Frank | B60L 50/61 320/104 |

(Continued)

FOREIGN PATENT DOCUMENTS

| | | |
|---|---|---|
| JP | 2010-179712 A | 8/2010 |
| JP | 2014-43851 A | 3/2014 |

*Primary Examiner* — Dirk Wright
(74) *Attorney, Agent, or Firm* — Troutman Pepper Hamilton Sanders LLP

(57) ABSTRACT

A control apparatus for a vehicle controls a hybrid vehicle including a drive motor and an engine, both of which are linked to a driving wheel. The control apparatus includes: a regenerative controller; a fuel injection controller; a clutch controller; a condition satisfaction determiner; and a delay controller. The regenerative controller regeneratively drives the drive motor at the time of decelerating the hybrid vehicle. The fuel injection controller stops a fuel injection at the time of decelerating the hybrid vehicle. The clutch controller releases a clutch that switches a power transmission on and off between the engine and the driving wheel at the time of a regenerative driving by the regenerative controller. The condition satisfaction determiner determines whether execution conditions of diagnoses performed in a fuel cut state in which the clutch is engaged and the fuel injection is stopped are all satisfied.

10 Claims, 5 Drawing Sheets

(56) References Cited

U.S. PATENT DOCUMENTS

| | | | | |
|---|---|---|---|---|
| 8,903,583 B2* | 12/2014 | Araki | ................ | B60L 15/20 |
| | | | | 701/22 |
| 8,924,063 B2* | 12/2014 | Sawayama | ............ | B60W 10/02 |
| | | | | 701/22 |
| 9,694,711 B2* | 7/2017 | Mitsuoka | ................ | B60L 7/14 |
| 9,908,417 B2* | 3/2018 | Liang | ................ | B60L 7/18 |
| 2011/0004363 A1* | 1/2011 | Severinsky | ............ | B60W 20/10 |
| | | | | 701/22 |
| 2012/0330505 A1* | 12/2012 | Tsumori | ............... | B60W 10/08 |
| | | | | 701/36 |
| 2014/0058597 A1 | 2/2014 | Park | | |

* cited by examiner

CONTROL APPARATUS AND CONTROL METHOD FOR VEHICLE

CROSS-REFERENCE TO RELATED APPLICATIONS

The present application claims priority from Japanese Patent Application No. 2018-113241 filed on Jun. 14, 2018, the entire contents of which are hereby incorporated by reference.

BACKGROUND

The present disclosure relates to a control apparatus and control method for a vehicle.

In recent years, as a power source of a vehicle such as an automobile, a hybrid vehicle including both an engine and a motor has been known. Examples thereof include a hybrid vehicle that is subjected to drive control while switching a first driving mode in which the hybrid vehicle travels with only an output of a motor, and a second driving mode in which the hybrid vehicle travels with a combination of an output of the engine and an output of a motor. In addition, examples thereof include a hybrid vehicle that uses the engine as a main power source, and causes a motor to output assist torque in the case where the required torque of the vehicle is large.

These hybrid vehicles are each subjected to regenerative control that causes a motor to generate electric power with the kinematic energy of a driving wheel when the vehicle decelerates, and charges a battery with the generated electric power. When the regenerative control is performed, control of disengaging the engine from the driving wheels is performed. This control prevents the kinetic energy of the driving wheels from being transmitted to the engine, so that the regeneration efficiency is improved. In addition, this control can stop fuel injection to the engine while the engine is disengaged from the driving wheels, so that the fuel consumption amount can be reduced.

Here, diagnosis control is sometimes executed in the hybrid vehicle in the state in which fuel injection to the engine is stopped. For instance, Japanese Unexamined Patent Application Publication (JP-A) No. 2014-43851 discloses technology of opening the engine clutch when the coasting condition is satisfied that the accelerator is turned off and the vehicle speed enters a deceleration range defined in advance, and diagnosing an oxygen sensor when a hybrid starter generator drives the engine at reference speed defined in advance and fuel injection to the engine is stopped.

In addition, JP-A No. 2010-179712 discloses technology of motoring the internal combustion engine and performing a failure diagnosis that has not yet been performed in the state in which fuel injection to the internal combustion engine is stopped when the accelerator is turned off in the state in which at least one of failure diagnoses of a sensor or an apparatus attached to the exhaust system of the internal combustion engine which are performed while stopping fuel injection to the internal combustion engine and motoring the internal combustion engine has not yet been performed and in the state in which fuel is injected to the internal combustion engine and the internal combustion engine is running.

SUMMARY

An aspect of the disclosure provides a control apparatus for a vehicle. The control apparatus is configured to control a hybrid vehicle including a drive motor and an engine, both of which are linked to a driving wheel. The control apparatus includes a regenerative controller, a fuel injection controller, a clutch controller, a condition satisfaction determiner, and a delay controller. The regenerative controller is configured to regeneratively drive the drive motor at the time of decelerating the hybrid vehicle. The fuel injection controller is configured to stop a fuel injection at the time of the deceleration. The clutch controller is configured to release a clutch that switches a power transmission on and off between the engine and the driving wheel at the time of a regenerative driving by the regenerative controller. The condition satisfaction determiner is configured to determine whether execution conditions of diagnoses performed in a fuel cut state in which the clutch is engaged and the fuel injection is stopped are all satisfied. The delay controller is configured to delay a release of the clutch in a case where the execution conditions of the diagnoses are all satisfied at the time of starting the regenerative driving.

An aspect of the disclosure provides a control method for a vehicle. The control method performs a control of stopping a fuel injection to an engine and regeneratively driving a drive motor when a hybrid vehicle decelerates. The hybrid vehicle includes the drive motor and the engine, both of which are linked to a driving wheel decelerates. The control method includes releasing a clutch that switches a power transmission on and off between the engine and the driving wheel at the time of a regenerative driving by the regenerative controller. The control method includes delaying a release of the clutch in a case where execution conditions of diagnoses performed in a fuel cut state are all satisfied at the time of starting the regenerative driving.

An aspect of the disclosure provides a control apparatus for a vehicle. The control apparatus is configured to control a hybrid vehicle comprising a drive motor and an engine, both of which are linked to a driving wheel. The control apparatus includes circuitry. The circuitry is configured to regeneratively drive the drive motor at a time of decelerating the hybrid vehicle. The circuitry is configured to stop a fuel injection at the time of decelerating the hybrid vehicle. The circuitry is configured to release a clutch that switches a power transmission on and off between the engine and the driving wheel at a time of a regenerative driving by the regenerative controller. The circuitry is configured to determine whether execution conditions of diagnoses performed in a fuel cut state in which the clutch is engaged and the fuel injection is stopped are all satisfied. The circuitry is configured to delay a release of the clutch in a case where the execution conditions of the diagnoses are all satisfied at a time of starting the regenerative driving.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
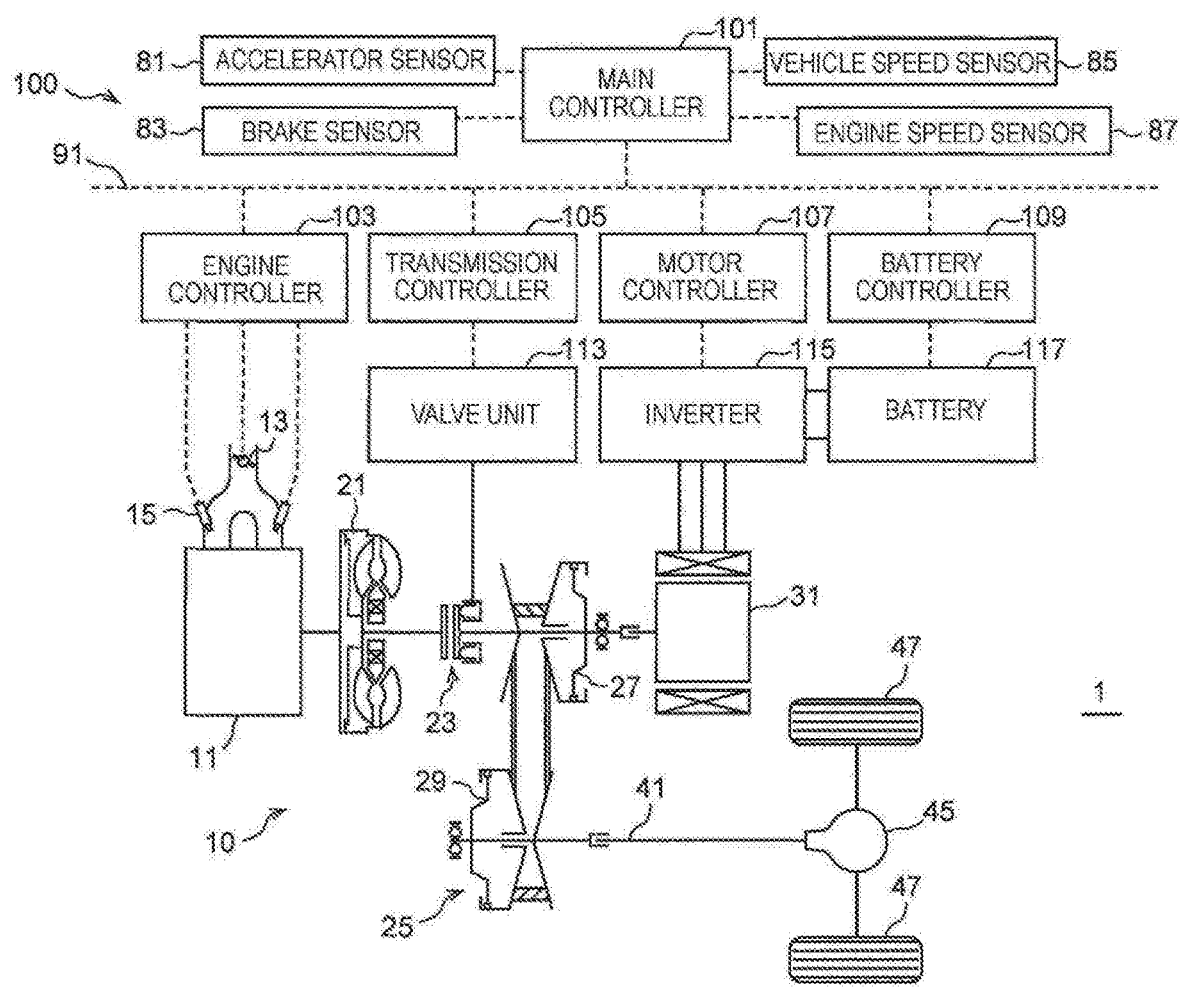
FIG. 1 is a schematic diagram illustrating a configuration instance of a hybrid vehicle to which a control apparatus for a vehicle according to an embodiment of the disclosure can be applied.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. Here, to execute control (this control will also be referred to as "fuel cut control" and the state in which the fuel cut control is performed will also be referred to as "fuel cut state") of stopping fuel injection in the state in which the engine is driven, a hybrid vehicle including no hybrid starter generator or no motoring motor has to couple the engine clutch and keep the state in which the kinetic energy of the driving wheels is transmitted to the engine. Therefore, in the case where the execution condition of a certain diagnosis is satisfied, a release of the engine clutch is delayed to perform fuel cut control, and a sensor or an apparatus is diagnosed when a driver releases the accelerator pedal and the required torque of the vehicle becomes zero.

However, in the case where there are diagnoses executed using the fuel cut state, control of delaying a release of the engine clutch by a predetermined time when the execution condition of each diagnosis is satisfied causes the fuel cut state to frequently occur. Therefore, the time for disengaging the engine from the driving wheels at the time of regenerative control becomes shorter, which can reduce the regeneration efficiency.

It is desirable to provide a control apparatus and control method for a vehicle which can reduce the number of times control of delaying a release of an engine clutch is performed in a hybrid vehicle, and improve regeneration efficiency.

<1. Overall Configuration Instance of Hybrid Vehicle>

First, a configuration instance of a hybrid vehicle to which a control apparatus for a vehicle according to an embodiment of the disclosure can be applied will be described. FIG. 1 is a schematic diagram illustrating a hybrid vehicle 1 including a control apparatus 100 for a vehicle. The following describes an overall configuration instance of the hybrid vehicle 1 individually for a power unit 10 and the control apparatus 100.

(1-1. Power Unit)

The power unit 10 of the hybrid vehicle 1 includes, as power sources, an engine 11 and a motor generator 31. The motor generator 31 functions as a drive motor. In addition, the power unit 10 includes a continuously variable transmission (which will also be referred to as "CVT" below) 25 including a primary pulley 27 and a secondary pulley 29.

One of the sides of the shaft of the primary pulley 27 is linked to the engine 11 via a torque converter 21. The other side of the shaft of the primary pulley 27 is linked to the motor generator 31. The shaft of the secondary pulley 29 is linked to driving wheels 47 via a driving wheel output shaft 41 and a differential mechanism 45. In this way, the driving wheels 47 are linked to the motor generator 31 and the engine 11.

The motor generator 31 is coupled to a battery 117 via an inverter 115. The inverter 115 has a function of mutually converting direct-current power and alternating-current power. When the motor generator 31 is controlled in a power running state, the inverter 115 converts direct-current power into alternating-current power and the motor generator 31 is supplied with electric power from the battery 117 via the inverter 115. Meanwhile, the motor generator 31 is controlled in a power generating state, that is, a regenerative state, the inverter 115 converts alternating-current power into direct-current power and the battery 117 is supplied with electric power from the motor generator 31 via the inverter 115.

There is provided an engine clutch 23 that is switched between an engaged state and a release state between the torque converter 21 and the primary pulley 27, that is, between the engine 11 and the driving wheels 47. Switching the engine clutch 23 to the engaged state couples the torque converter 21 to the primary pulley 27, and couples the engine 11 to the driving wheels 47. Meanwhile, switching the engine clutch 23 to the release state uncouples the torque converter 21 from the primary pulley 27, and the engine 11 is uncoupled from the driving wheels 47.

Note that the engine clutch 23 is switched to enter the release state, thereby keeping, even in the case where the engine 11 is uncoupled from the driving wheels 47, the coupled state between the driving wheels 47 and the motor generator 31. That is, switching the engine clutch 23 to the release state makes it possible to uncouple the driving wheels 47 and the engine 11 from each other in the state in which the driving wheels 47 and the motor generator 31 are coupled to each other.

(1-2. Control Apparatus)

The overall configuration of the control apparatus 100 for the hybrid vehicle 1 will be described. As illustrated in FIG. 1, the hybrid vehicle 1 includes a variety of controllers including microcomputers and the like to control the working state of the power unit 10. As the variety of controllers, an engine controller 103, a transmission controller 105, a motor controller 107, a battery controller 109, and a main controller 101 are included.

Some or all of the respective controllers may include, for instance, microcomputers, microprocessor units, and the like. In addition, some or all of the respective controllers may include firmware and the like that can be updated, or may be program modules and the like that are executed in accordance with an instruction from a CPU and the like.

In addition, each controller includes a storage (not illustrated) that stores a program executed by a microcomputer and the like, information of a parameter, detection data and a calculation result which is used for various kinds of calculation, and the like. The storage may be, for instance, a storage element such as a random access memory (RAM) or a read only memory (ROM), or may also be a storage such as a hard disk drive (HDD), a CD-ROM, or a storage apparatus.

The engine controller 103 controls the engine 11. The transmission controller 105 controls the CVT 25 and the like. The motor controller 107 controls the motor generator 31. The battery controller 109 controls the battery 117. The main controller 101 integrally controls these controllers. These controllers are coupled to each other via one or more in-vehicle networks 91 such as controller area networks (CANs) or local internets (LINs) in a communicable manner.

The main controller 101 outputs a control signal to each controller, and causes the engine 11, the motor generator 31, and the like included in the power unit 10 to cooperate with each other for control. The main controller 101 is coupled to an accelerator sensor 81, a brake sensor 83, a vehicle speed sensor 85, and an engine speed sensor 87. The accelerator sensor 81 detects the operation amount of an accelerator pedal. The brake sensor 83 detects the operation amount of a brake pedal. The vehicle speed sensor 85 detects vehicle speed. The engine speed sensor 87 detects engine speed that is the rotational speed of a crankshaft.

The main controller 101 sets the control target of the engine 11, the motor generator 31 or the like on the basis of information transmitted from each sensor or controller, and outputs a control signal to each controller on the basis of the set control target. Each controller that receives a control signal from the main controller 101 controls the engine 11, the motor generator 31, or the like as follows.

That is, the engine controller 103 outputs control signals to a throttle valve 13, an injector 15, and the like to control the engine torque, the engine speed, and the like. The transmission controller 105 outputs a control signal to a valve unit 113 that adjusts the pressure of a working fluid, and controls the working state of the CVT 25, the engine clutch 23, the torque converter 21, and the like. The motor controller 107 outputs a control signal to the inverter 115 to control the motor torque, motor rotational speed, and the like of the motor generator 31. The battery controller 109 monitors the charging and discharging of the battery 117, and controls the relay and the like inside the battery 117 as required. In this way, the respective controllers control the engine 11, the motor generator 31, the engine clutch 23, and the like.

<2. Basic Operation of Deceleration Control>

Next, the basic operation of vehicle deceleration control at the time of coasting will be described. The time of coasting refers to the time when the vehicle decelerates with stepping on both the accelerator pedal and brake pedal cancelled, that is, the time when the vehicle decelerates with an accelerator operation and brake operation by a driver both cancelled.

During coasting during which stepping on the accelerator pedal is cancelled, fuel injection to the engine 11 is stopped, and the motor generator 31 is also controlled to enter the regenerative state. At this time, the engine clutch 23 enters the release state, and kinetic energy input to the power unit 10 from the driving wheels 47 is converted into electric energy by the motor generator 31. The deceleration of the vehicle at the time of coasting can be adjusted in accordance with the rotational resistance or regenerative torque of the motor generator 31.

Here, at the time of coasting, the target deceleration torque of the hybrid vehicle 1 is set on the basis of vehicle speed and the like. The target deceleration torque is torque for decelerating the hybrid vehicle 1 without making a driver feel strange at the time of coasting. The target motor torque is set in accordance with this target deceleration torque, and the regenerative torque of the motor generator 31 is controlled on the basis of the target motor torque. This makes it possible to decelerate the hybrid vehicle 1 with the target deceleration torque, and decelerate the hybrid vehicle 1 without making a driver feel strange.

However, even at the time of coasting, fuel cut control of keeping the engine clutch 23 in the engaged state, and stopping fuel injection in the state in which the engine 11 is driven is sometimes executed. Specifically, in the case where the execution conditions of various diagnoses that can be executed using the fuel cut state are satisfied, fuel cut control is executed by delaying a release of the engine clutch 23 even at the time of coasting.

In the case where the engine clutch 23 is released, the engine 11 stops in a short period of time. In contrast, during fuel cut control, the engine 11 is kept in the driven state, so that an intake valve and an exhaust valve continue opening and closing with the rotation of the cam shaft linked to the crankshaft via a timing belt and the like. That is, a diagnosis executed using the fuel cut state requires the output torque of the engine 11 to be zero, and requires the state in which exhaust gas flows in an exhaust pipe. Instances of such a diagnosis will be concisely described below.

(a) Failure Diagnosis of Oxygen Concentration Sensor

Once fuel cut control is started, the exhaust gas emitted from the engine 11 is ruled by the atmosphere. Therefore, monitoring whether the value of a sensor signal of an oxygen concentration sensor obtained after a predetermined time elapses since the fuel cut control is started becomes the value corresponding to the oxygen concentration of the atmosphere makes it possible to determine whether the oxygen concentration sensor has a failure. The predetermined time here can be set in advance in accordance with an experiment and the like.

The execution condition of a failure diagnosis of an oxygen concentration sensor may be the condition that, for instance, the exhaust gas temperature is higher than or equal to the activation temperature of the oxygen concentration sensor, the vehicle is traveling, that is, exhaust gas is flowing in an exhaust path, and no failure diagnosis is executed in the current driving cycle.

(b) Failure Diagnosis of Air-to-Fuel Ratio Sensor

Similarly, once fuel cut control is started, the exhaust gas emitted from the engine 11 is ruled by the atmosphere. Therefore, monitoring whether the value of a sensor signal of an air-to-fuel ratio sensor obtained after a predetermined time elapses since the fuel cut control is started becomes the value of the air-to-fuel ratio of the atmosphere makes it possible to determine whether the air-to-fuel ratio sensor has a failure. The predetermined time here can be set in advance in accordance with an experiment and the like.

The execution condition of a failure diagnosis of an air-to-fuel ratio sensor may be the condition that, for instance, the exhaust gas temperature is higher than or equal to the activation temperature of the air-to-fuel ratio sensor, and the vehicle is traveling, that is, exhaust gas is flowing in an exhaust path, the air-to-fuel ratio before the fuel cut control is started to be executed is not the air-to-fuel ratio corresponding to the atmosphere, and no failure diagnosis is executed in the current driving cycle.

(c) Failure Diagnosis of EGR Apparatus

In an exhaust gas recirculation (EGR) apparatus, exhaust gas is introduced to the intake side by negative pressure occurring in an intake path when an EGR valve is opened. During fuel cut control, the engine 11 undergoes an extremely small load fluctuation. Accordingly, in the case where the EGR apparatus is normal, the intake pressure undergoes a relatively large fluctuation with the opening and closing EGR valve. Therefore, determining, during fuel cut control, whether a difference between the intake pressure obtained when the EGR valve is forced to be fully opened and the intake pressure obtained when the EGR valve is forced to be fully closed exceeds a threshold set in advance makes it possible to whether the EGR apparatus has a failure.

The execution condition of a failure diagnosis of the EGR apparatus like this may be the condition that, for instance, the water temperature is higher than or equal to a predetermined value, the vehicle is traveling, the engine speed is within a predetermined range, and no failure diagnosis is executed in the current driving cycle.

(d) Failure Diagnosis of Exhaust Gas Purifying Catalyst

The exhaust system of the engine 11 includes an exhaust gas purifying catalyst used to purify exhaust gas. For instance, the exhaust system of a gasoline engine includes three-way catalysts that reduce carbon hydride (HC), carbon monoxide (CO), and nitrogen oxide (NO) in exhaust gas. The oxygen occluding capability of the three-way catalysts characteristically decreases as the three-way catalysts deteriorate. Therefore, in the case where fuel cut control is executed for a predetermined time, the amount of oxygen corresponding to the oxygen occluding capability of the three-way catalysts is occluded by the three-way catalysts.

Thus, when fuel injection to the engine 11 is restarted after fuel cut control is terminated, it is possible to make the air-to-fuel ratio rich in fuel, cause a catalyst to emit the occluded oxygen, and determine, on the basis of the amount of excess fuel with respect to the theoretical air-to-fuel ratio before an air-to-fuel ratio sensor or an oxygen concentration sensor on the downstream of the catalyst detects the fuel rich state, whether the oxygen occluding capability of catalyst decreases. Such a diagnosis is not limited to the three-way catalysts, but is applicable to a catalyst having oxygen occluding capability.

The execution condition of a failure diagnosis of an exhaust gas purifying catalyst like this may be the condition that, for instance, the catalyst temperature is higher than or equal to the activation temperature, the vehicle is traveling, and no failure diagnosis is executed in the current driving cycle.

Note that the execution conditions of the above-described diagnoses (a) to (d) demonstrated as instances are set, for instance, to be executed once in one driving cycle from the start switch of the hybrid vehicle 1 being activated to being turned off. In addition, a diagnosis executed using the fuel cut state is not limited to the instances of the diagnoses (a) to (d) described above, but a diagnosis other than the diagnoses demonstrated as instances may be executable.

The control apparatus 100 for the hybrid vehicle 1 according to the present embodiment executes control (which will also be referred to as "release delay control" below) of delaying a release of the engine clutch 23 at the time of coasting when stepping on the accelerator pedal is cancelled and the motor generator 31 is regeneratively driven in the case where the execution conditions of the diagnoses described above are all satisfied when coasting is started. That is, the control apparatus 100 does not independently make a request to delay a release of the engine clutch 23 for each diagnosis in the case where the conditions of individual diagnoses are satisfied, but makes a request to delay a release of the engine clutch 23 only in the case where the conditions of all the diagnoses are satisfied.

<3. Specific Instance of Control Apparatus>

Next, a specific instance of the control apparatus 100 for the hybrid vehicle 1 according to the present embodiment which can execute the release delay control described above will be described.

Figure 2:
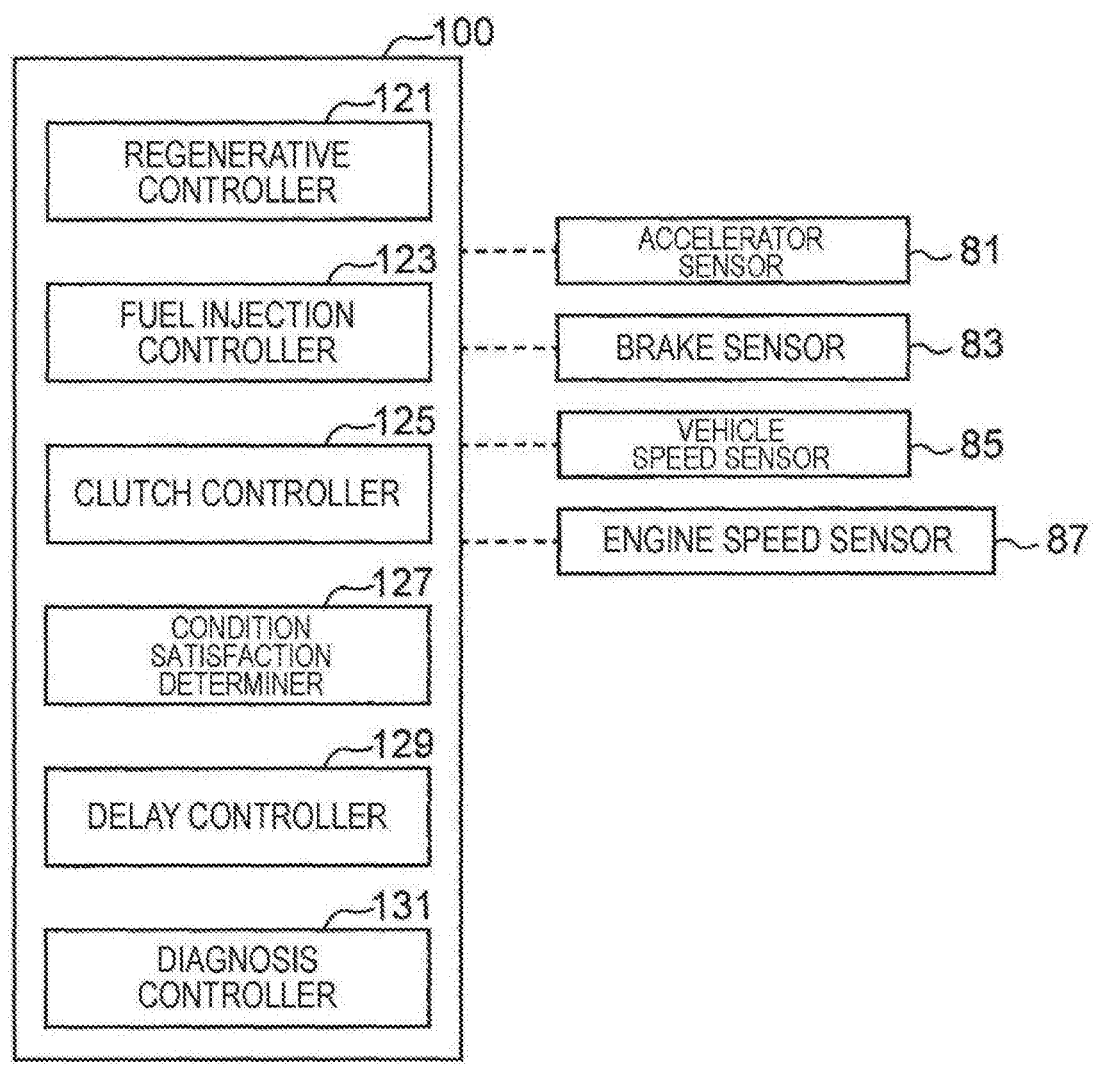
FIG. 2 is a block diagram illustrating a configuration instance of the control apparatus for a vehicle according to the embodiment.

FIG. 2 is an explanatory diagram illustrating the functional configuration of a part of the control apparatus 100 for a vehicle including the controllers illustrated in FIG. 1 which is related to release delay control. The control apparatus 100 includes a regenerative controller 121, a fuel injection controller 123, a clutch controller 125, a condition satisfaction determiner 127, a delay controller 129, and a diagnosis controller 131.

(Regenerative Controller)

For instance, the main controller 101 and the motor controller 107 function as the regenerative controller 121. The regenerative controller 121 regeneratively drives the motor generator 31 when the hybrid vehicle 1 decelerates. Specifically, when detecting that stepping on the accelerator pedal is cancelled on the basis of an input signal from the accelerator sensor 81, the regenerative controller 121 performs control to bring the motor generator 31 into the regenerative state.

In the present embodiment, even in the case where stepping on the accelerator pedal is cancelled, the engine clutch 23 is kept in the engaged state while release delay control is executed. In this case, the engine brake is actuated, so that the engine torque is output onto the deceleration side. The regenerative controller 121 subtracts the engine torque from the target deceleration torque set on the basis of the vehicle speed and the like in the engaged state of the engine clutch 23, thereby setting the target motor torque. In addition, the regenerative controller 121 sets the target deceleration torque of the hybrid vehicle 1 as target motor torque in the release state of the engine clutch 23.

The regenerative controller 121 controls the inverter 115 on the basis of the set target motor torque, and regeneratively drives the motor generator 31. This causes the motor generator 31 to perform regenerative power generation, and the battery 117 is charged with the generated electric power.

(Fuel Injection Controller)

For instance, the main controller 101 and the engine controller 103 function as the fuel injection controller 123. When detecting that stepping on the accelerator pedal is cancelled on the basis of an input signal from the accelerator sensor 81, the fuel injection controller 123 stops fuel injection. Specifically, the fuel injection controller 123 stops the injector 15 from fuel injection control.

In addition, when the accelerator pedal is stepped on again, the fuel injection controller 123 sets the target engine torque by subtracting, for instance, assist torque output to the motor generator 31 from the required torque of the hybrid vehicle 1 which is set on the basis of the accelerator operation amount and the engine speed. The fuel injection controller 123 controls electricity flowing in the injector 15 on the basis of the set target engine torque, and injects fuel to the engine 11. This causes the engine 11 to output driving torque that is transmitted to the driving wheels 47.

(Clutch Controller)

For instance, the main controller 101 and the transmission controller 105 function as the clutch controller 125. The clutch controller 125 releases the engine clutch 23 when the regenerative controller 121 executes regenerative driving. Specifically, the clutch controller 125 controls the valve unit 113 to release the engine clutch 23. However, while a clutch release delay request is generated from the delay controller 129, the clutch controller 125 makes the engine clutch 23 wait in the engaged state.

(Condition Satisfaction Determiner)

For instance, the main controller 101 functions as the condition satisfaction determiner 127. The condition satisfaction determiner 127 determines whether the execution conditions of diagnoses executed using the fuel cut state are all satisfied. In the present embodiment, the condition satisfaction determiner 127 determines whether the execution conditions of the diagnoses (a) to (d) described above are all satisfied.

(Delay Controller)

For instance, the main controller 101 functions as the delay controller 129. In the case where the execution conditions of diagnoses are all satisfied when the regenerative controller 121 starts to execute regenerative driving, the delay controller 129 generates a clutch release delay request to delay a release of the engine clutch 23. The delay controller 129 may generate a clutch release delay request, for instance, within a delay time set in advance as a longer time than the time required for control to be executed in the fuel cut state in the diagnoses (a) to (d) described above. Alternatively, the delay controller 129 may generate a clutch release delay request before a process to be executed in the fuel cut state is terminated in the diagnoses (a) to (d) described above.

(Diagnosis Controller)

For instance, the main controller 101 and the engine controller 103 function as the diagnosis controller 131. The diagnosis controller 131 controls the throttle valve 13, the EGR apparatus, or the like in accordance with the content of each diagnosis, and executes diagnoses defined in advance. Among the respective processes of diagnosis control, a process performed in the fuel cut state is executed during fuel cut control.

<4. Operation Instance of Control Apparatus>

Next, a separation control process performed by the control apparatus 100 for the hybrid vehicle 1 according to the present embodiment on the engine clutch 23 at the time of coasting will be described.

Figure 3:
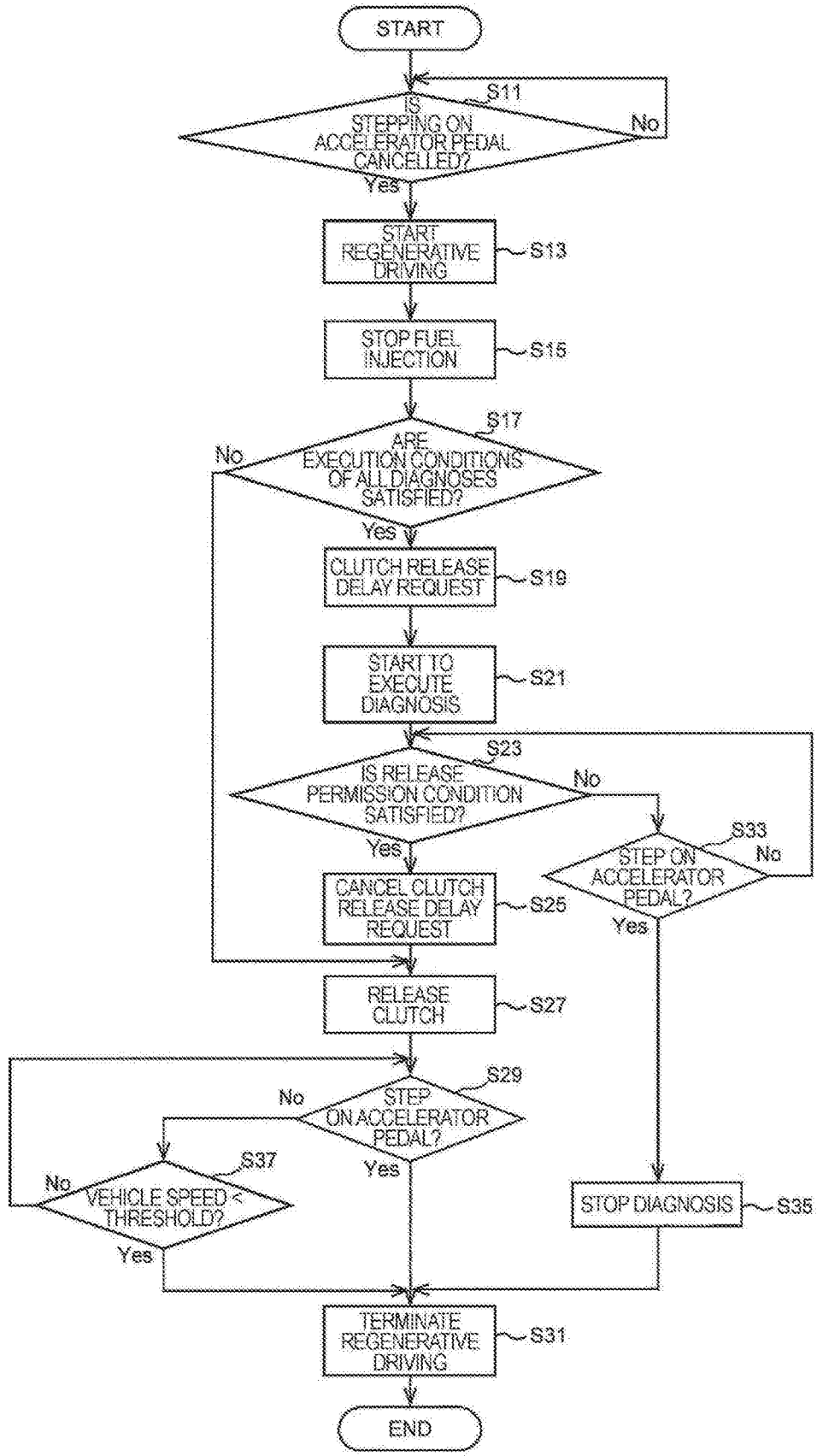
FIG. 3 is a flowchart illustrating an instance of a control method for a vehicle according to the embodiment.

FIG. 3 is a flowchart illustrating an instance of a separation control process for the engine clutch 23 which is performed by the control apparatus 100.

First, the regenerative controller 121 determines, on the basis of input signals from the accelerator sensor 81 and the brake sensor 83, whether the hybrid vehicle 1 starts to coast (step S11). For instance, the regenerative controller 121 determines whether a driver cancels stepping on the accelerator pedal. The regenerative controller 121 repeats the determination of step S11 until the hybrid vehicle 1 starts to coast (S11/No).

In the case where the regenerative controller 121 determines that the hybrid vehicle 1 starts to coast (S11/Yes), the regenerative controller 121 starts regenerative driving (step S13). Specifically, the regenerative controller 121 sets the target deceleration torque of the hybrid vehicle 1 in accordance with the vehicle speed acquired on the basis of an input signal from the vehicle speed sensor 85, and sets the target motor torque with the engaged state of the engine clutch 23 taken into consideration to control the inverter 115.

While regenerative driving continues, the regenerative controller 121 sets the target motor torque as the value obtained by subtracting the engine torque from the target deceleration torque in the engaged state of the engine clutch 23, and controls the inverter 115. In addition, the regenerative controller 121 sets the target motor torque as the target deceleration torque in the release state of the engine clutch 23, and controls the inverter 115. This causes the motor generator 31 to be regeneratively driven, and the battery 117 is charged with the generated electric power.

Next, the fuel injection controller 123 stops fuel injection to the engine 11 (step S15). Specifically, the fuel injection controller 123 stops electricity flowing to the injector 15, and keeps the injector 15 in a closed-valve state.

Next, the diagnosis controller 131 determines whether the execution conditions of diagnoses executed using the fuel cut state are all satisfied (step S17). In the present embodiment, the diagnosis controller 131 determines whether the execution conditions of the diagnoses (a) to (d) described above are all satisfied. In the case where at least some of the execution conditions of the diagnoses are not satisfied (S17/No), the clutch controller 125 quickly brings the engine clutch 23 into the release state (step S27). Specifically, the clutch controller 125 controls the valve unit 113 to release the engine clutch 23. This disengages the engine 11 from the driving wheels 47, and improves the regeneration efficiency of the motor generator 31.

In contrast, in the case where the execution conditions of the diagnoses are all satisfied in step S17 (S17/Yes), the delay controller 129 generates a clutch release delay request to delay a release of the engine clutch 23 (step S19). This causes the clutch controller 125 to keep the engine clutch 23 in the engaged state.

Next, the diagnosis controller 131 starts to execute the diagnoses using the fuel cut state (step S21). In the present embodiment, the diagnosis controller 131 starts to execute the diagnoses (a) to (d) described above.

Next, the delay controller 129 determines whether a clutch release permission condition is satisfied (step S23). The clutch release permission condition may be the condition that, for instance, a delay time set in advance as a longer time than the time required for control to be executed in the fuel cut state in the diagnoses (a) to (d) described above elapses. In this case, the delay controller 129 does not have to monitor the progress state of a diagnosis process, so that it is possible to reduce the loads on the control apparatus 100. Alternatively, the clutch release permission condition may be the condition that a process to be executed in the fuel cut state in the diagnoses (a) to (d) described above is terminated. In this case, the engine clutch 23 is quickly released along with the termination of the process to be executed, so that it is possible to reduce the engaged time of the engine clutch 23 as much as possible.

In the case where the clutch release permission condition is not satisfied (S23/No), the regenerative controller 121 determines, on the basis of an input signal from the accelerator sensor 81, whether the accelerator pedal is stepped on (step S33). In the case where stepping on the accelerator pedal remains cancelled (S33/No), the flow returns to step S23 and the delay controller 129 repeats the determination about whether the clutch release permission condition is satisfied. In contrast, in the case where the accelerator pedal is stepped on (S33/Yes), the diagnosis controller 131 stops a diagnosis from being executed (step S35) and the regenerative controller 121 terminates regenerative driving (step S31).

In contrast, in the case where the clutch release permission condition is satisfied in step S23 (S23/Yes), the delay controller 129 cancels the clutch release delay request (step S25). Next, the clutch controller 125 quickly brings the engine clutch 23 into the release state (step S27). This disengages the engine 11 from the driving wheels 47, and improves the regeneration efficiency of the motor generator 31.

Next, the regenerative controller 121 determines, on the basis of an input signal from the accelerator sensor 81, whether the accelerator pedal is stepped on (step S29). In the case where the accelerator pedal is stepped on (S29/Yes), the regenerative controller 121 terminates regenerative driving (step S31). In contrast, in the case where stepping on the accelerator pedal remains cancelled (S29/No), the regenerative controller 121 determines, on the basis of an input signal from the vehicle speed sensor 85, whether the vehicle speed is lower than a threshold set in advance (step S37). An appropriate value is set in advance as the threshold to terminate regenerative driving by the motor generator 31.

In the case where the vehicle speed is higher than or equal to the threshold (S37/No), the regenerative controller 121 returns to step S29 and repeats the determination about whether the accelerator pedal is stepped on. In contrast, in the case where the vehicle speed is lower than the threshold (S37/Yes), the regenerative controller 121 terminates regenerative driving (step S31).

In this way, after a driver cancels stepping on the accelerator pedal, and the hybrid vehicle 1 starts to coast, the motor generator 31 performs regenerative driving. For this time, release delay control is performed on the engine clutch 23 only in the case where the execution conditions of diagnoses using the fuel cut state are all satisfied, and the engine clutch 23 is quickly released in the case where at least some of the execution conditions are not satisfied. Thus, the time for which the engine clutch 23 is kept in the engaged state at the time of coasting decreases, and the regeneration efficiency is improved.

Figure 4:
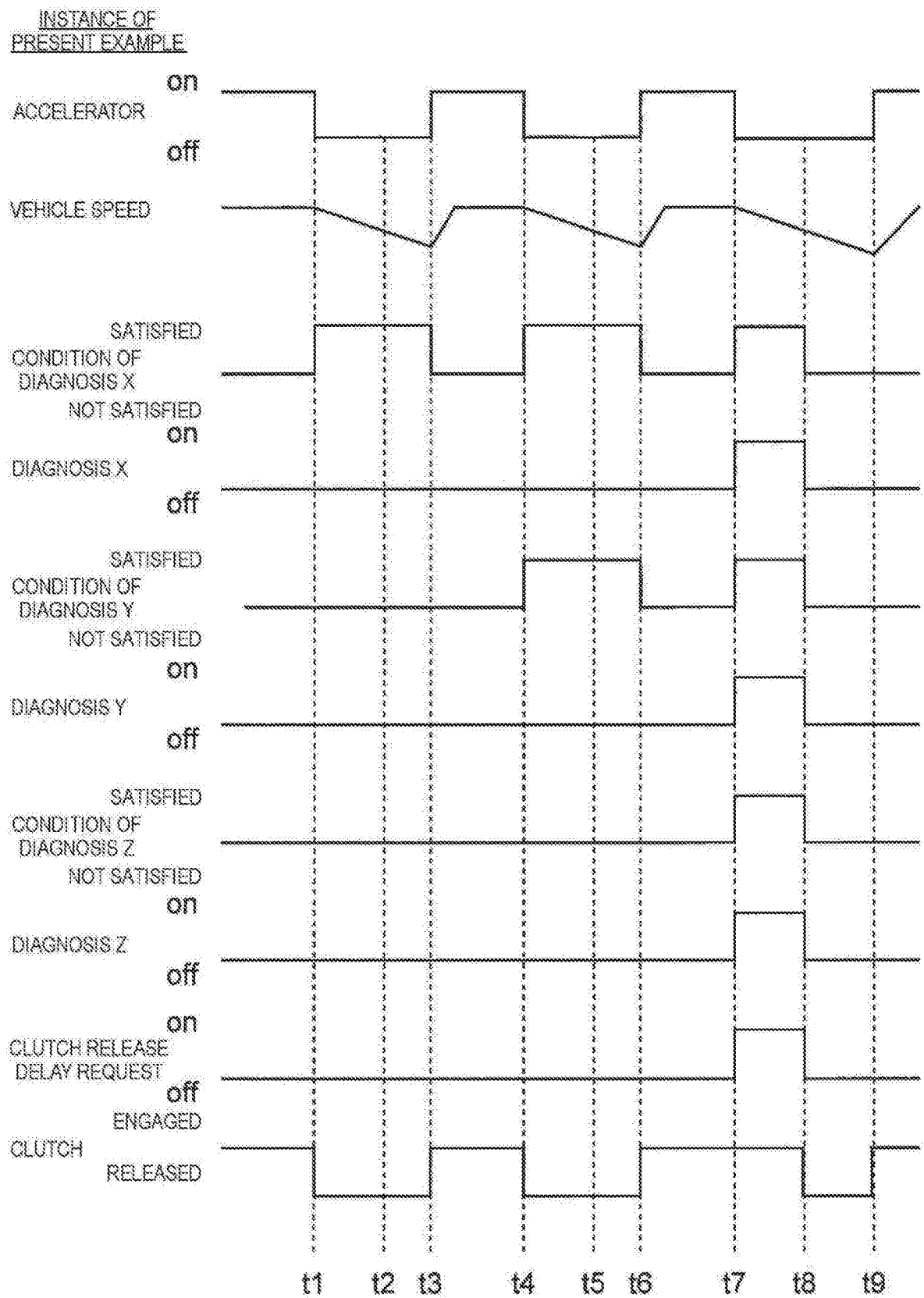
FIG. 4 is an explanatory diagram illustrating an instance of the control method for a vehicle according to the embodiment.
Figure 5:
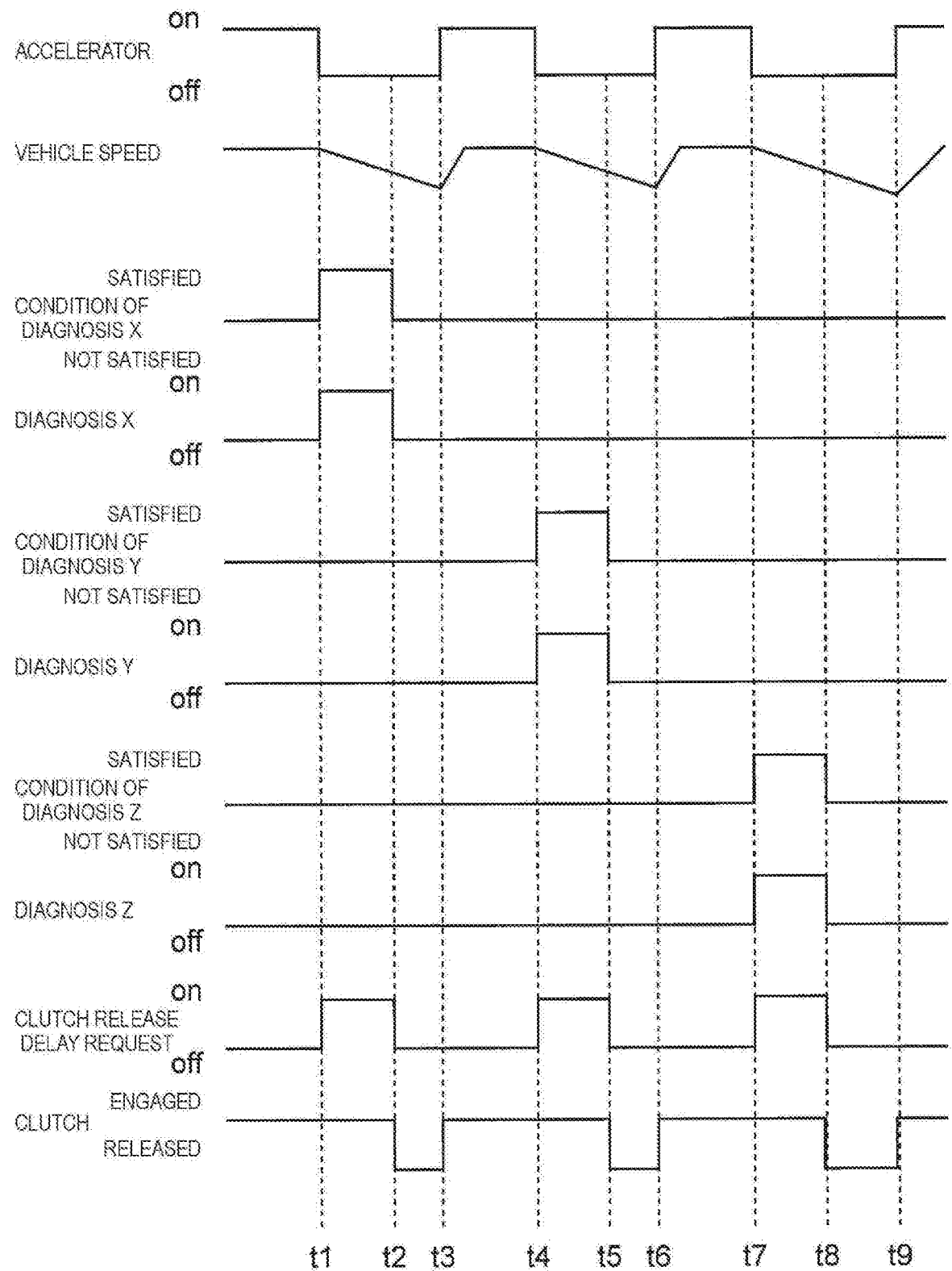
FIG. 5 is an explanatory diagram illustrating an instance of a control method for a vehicle according to a comparative example.

FIGS. 4 and 5 are explanatory diagrams each illustrating the advantageous effects attained according to a control process performed by the control apparatus 100 for the hybrid vehicle 1 according to the present embodiment. FIG. 4 is a time chart in the case where a control method performed by the control apparatus 100 for the hybrid vehicle 1 according to the present embodiment is applied, and FIG. 5 is a time chart according to a comparative example. The comparative example is an instance in which control is executed of delaying a release of the engine clutch 23 in the case where the execution condition of each diagnosis is satisfied even if all the execution conditions of diagnoses are not satisfied.

Here, the case where three diagnoses X, Y, and Z are executed using the fuel cut state is used as an instance, and a difference between the time when the engine clutch 23 is released in the control method according to the present embodiment and the time when the engine clutch 23 is released in the comparative example will be described. Note that the three diagnoses X, Y, and Z are each executed once in one driving cycle.

While the hybrid vehicle 1 is traveling, stepping on the accelerator pedal is cancelled at time t1. At the time t1, the execution condition of the diagnosis X among the three diagnoses is satisfied. At this time, the execution conditions of the diagnoses Y and Z are not satisfied in the control method according to the present embodiment, so that the engine clutch 23 is quickly released with no clutch release delay request generated. In this case, the diagnosis X whose execution condition is satisfied is not executed. Afterward, the engine clutch 23 is released until time t3 when the accelerator pedal is stepped on again, and the engine clutch 23 is engaged at the time t3.

At the time t4, the execution conditions of the two diagnoses X and Y among the three diagnoses are satisfied. At this time, the execution condition of the diagnosis Z is not satisfied in the control method according to the present embodiment, so that the engine clutch 23 is quickly released with no clutch release delay request generated. In this case, the diagnoses X and Y whose execution conditions are satisfied are not executed. Afterward, the engine clutch 23 is released until time t6 when the accelerator pedal is stepped on again, and the engine clutch 23 is engaged at the time t6.

At the time t7, the execution conditions of all the diagnoses X, Y, and Z are satisfied. At this time, a clutch release delay request is generated in the control method according to the present embodiment, and the engine clutch 23 is kept in the engaged state until time t8 when processes to be executed in the fuel cut state are all terminated in the diagnoses X, Y, and Z. Then, at the time t8 when all the processes are terminated, the clutch release delay request is cancelled. This cause the engine clutch 23 to be released until time t9 when the accelerator pedal is stepped on, and the engine clutch 23 is engaged at the time t9.

Meanwhile, in the comparative example, even in the case where the execution conditions of the diagnoses Y and Z are not satisfied at the time t1, a clutch release delay request is generated and the engine clutch 23 is kept in the engaged state until the time t2 when the execution of the diagnosis X is terminated. Then, at the time t2 when the execution of the diagnosis X is terminated, the clutch release delay request is cancelled. This cause the engine clutch 23 to be released until time t3 when the accelerator pedal is stepped on, and the engine clutch 23 is engaged at the time t3.

In addition, in the comparative example, once the execution condition of the diagnosis Y among the two diagnoses Y and Z that are not terminated is satisfied at the time t4, a clutch release delay request is generated even in the case where the execution condition of the diagnosis Z is not satisfied. This keeps the engine clutch 23 in the engaged state until time t5 when the execution of the diagnosis Y is terminated. Then, at the time t5 when the execution of the diagnosis Y is terminated, the clutch release delay request is cancelled. This cause the engine clutch 23 to be released until time t6 when the accelerator pedal is stepped on, and the engine clutch 23 is engaged at the time t6.

In addition, in the comparative example, once the execution condition of the diagnosis Z that is not terminated is satisfied at the time t7, a clutch release delay request is generated and the engine clutch 23 is kept in the engaged state until the time t8 when the execution of the diagnosis Z is terminated. Then, at the time t8 when the execution of the diagnosis Z is terminated, the clutch release delay request is cancelled. This cause the engine clutch 23 to be released until time t9 when the accelerator pedal is stepped on, and the engine clutch 23 is engaged at the time t9.

In this way, in the comparative example, among the period of time between the time t1 to t3, the period of time between the time t4 to t6, and the period of time between the time t7 to t9 when the hybrid vehicle 1 coasts, release delay requests are generated in the period of time between the time t1 to t2, the period of time between the time t4 to t5, and the period of time between the time t7 to t8.

In contrast, in the control method according to the present embodiment, among the period of time between the time t1 to t3, the period of time between the time t4 to t6, and the period of time between the time t7 to t9 when the hybrid vehicle 1 coasts, a release delay request is generated only in the period of time between the time t7 to t8. Thus, the time for which the engine clutch 23 is kept in the engaged state while the hybrid vehicle 1 is coasting becomes shorter, so that it is possible to extend the time for which the engine clutch 23 is released. This makes it possible in the control method according to the present embodiment to improve the regeneration efficiency by the motor generator 31 while the hybrid vehicle 1 is coasting.

As described above, the control apparatus 100 for the hybrid vehicle 1 according to the present embodiment delays a release of the engine clutch 23 only in the all the execution conditions of diagnoses executed using the fuel cut state are satisfied when a driver cancels stepping on the accelerator pedal while the hybrid vehicle 1 is traveling. Therefore, it is possible to shorten the time for which the engine clutch 23 is kept in the engaged state while the motor generator 31 is executing regenerative driving. This makes it possible to reduce the kinetic energy of the driving wheels 47 which is transmitted to the engine 11 at the time of regenerative driving, and improve the regeneration efficiency.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For instance, in the embodiment described above, the control apparatus 100 for a vehicle includes six controllers, but the disclosure is not limited to the instance. The functions of some or all of the controllers described above may be integrated into one controller, or may also be divided into further controllers.

According to the disclosure as described above, it is possible to reduce the number of times control of delaying a release of the engine clutch is performed in the hybrid vehicle, and improve the regeneration efficiency.

The invention claimed is:

1. A control apparatus for a vehicle, the control apparatus being configured to control a hybrid vehicle comprising a drive motor and an engine, both of which are linked to a driving wheel, the control apparatus comprising:
 a processor configured to:
 regeneratively drive the drive motor at a time of decelerating the hybrid vehicle;
 stop a fuel injection at the time of decelerating the hybrid vehicle;
 release a clutch that switches a power transmission on and off between the engine and the driving wheel at a time of a regenerative driving;
 determine whether execution conditions of diagnoses performed in a fuel cut state in which the clutch is engaged and the fuel injection is stopped are all satisfied; and
 delay a release of the clutch in a case where the execution conditions of the diagnoses are all satisfied at a time of starting the regenerative driving.

2. The control apparatus for a vehicle according to claim 1, wherein
 while delaying the release of the clutch, the processor permits the release of the clutch when a release permission condition of the clutch is satisfied.

3. The control apparatus for a vehicle according to claim 2, wherein
 the processor determines whether a process to be executed in the fuel cut state in the diagnoses is terminated under the release permission condition of the clutch.

4. The control apparatus for a vehicle according to claim 2, wherein the processor determines whether a time set in advance elapses under the release permission condition of the clutch.

5. The control apparatus for a vehicle according to claim 1, wherein
 the diagnoses comprise at least two of a diagnosis of an oxygen concentration sensor provided to an exhaust path, a diagnosis of an air-to-fuel ratio sensor, a diagnosis of an EGR valve, or a diagnosis of a catalyst.

6. The control apparatus for a vehicle according to claim 2, wherein
 the diagnoses comprise at least two of a diagnosis of an oxygen concentration sensor provided to an exhaust path, a diagnosis of an air-to-fuel ratio sensor, a diagnosis of an EGR valve, or a diagnosis of a catalyst.

7. The control apparatus for a vehicle according to claim 3, wherein
 the diagnoses comprise at least two of a diagnosis of an oxygen concentration sensor provided to an exhaust path, a diagnosis of an air-to-fuel ratio sensor, a diagnosis of an EGR valve, or a diagnosis of a catalyst.

8. The control apparatus for a vehicle according to claim 4, wherein
 the diagnoses comprise at least two of a diagnosis of an oxygen concentration sensor provided to an exhaust path, a diagnosis of an air-to-fuel ratio sensor, a diagnosis of an EGR valve, or a diagnosis of a catalyst.

9. A control method for a vehicle, the control method performing a control of stopping a fuel injection to an engine and regeneratively driving a drive motor when a hybrid vehicle comprising the drive motor and the engine, both of which are linked to a driving wheel decelerates, the control method comprising:
 releasing a clutch that switches a power transmission on and off between the engine and the driving wheel at a time of a regenerative driving by the regenerative controller; and
 delaying a release of the clutch in a case where execution conditions of diagnoses performed in a fuel cut state are all satisfied at a time of starting the regenerative driving.

10. A control apparatus for a vehicle, the control apparatus being configured to control a hybrid vehicle comprising a drive motor and an engine, both of which are linked to a driving wheel, the control apparatus comprising:
 circuitry configured to
 regeneratively drive the drive motor at a time of decelerating the hybrid vehicle,
 stop a fuel injection at the time of decelerating the hybrid vehicle,
 release a clutch that switches a power transmission on and off between the engine and the driving wheel at a time of a regenerative driving by the regenerative controller,
 determine whether execution conditions of diagnoses performed in a fuel cut state in which the clutch is engaged and the fuel injection is stopped are all satisfied, and
 delay a release of the clutch in a case where the execution conditions of the diagnoses are all satisfied at a time of starting the regenerative driving.

* * * * *